Dec. 27, 1938.  J. A. GLENN  2,141,690
LAND LEVELER
Filed March 29, 1938
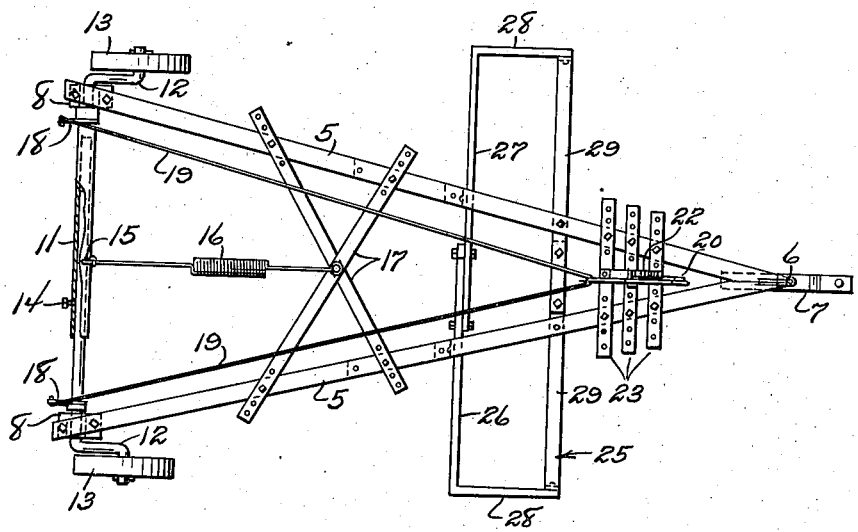
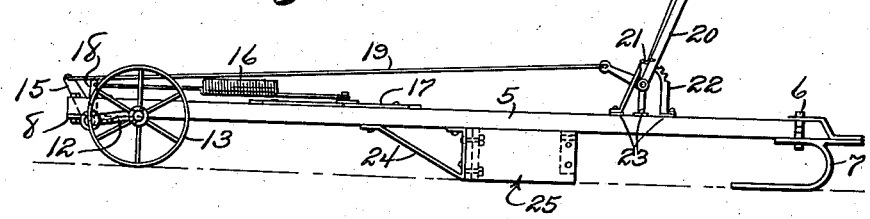
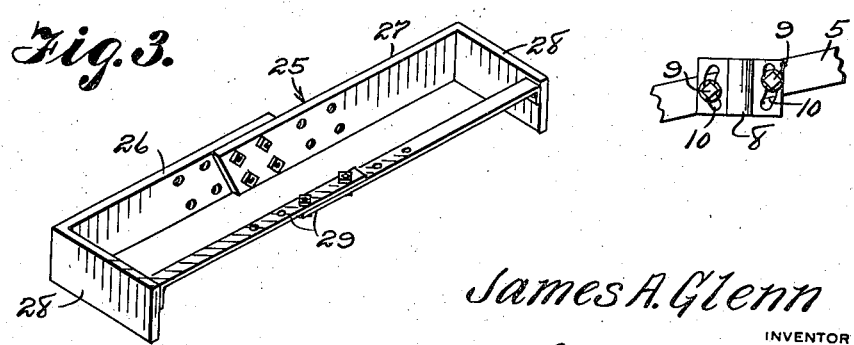
James A. Glenn
INVENTOR
BY Victor J. Evans & Co.
ATTORNEYS Patented Dec. 27, 1938

2,141,690

UNITED STATES PATENT OFFICE 2,141,690

LAND LEVELER

James A. Glenn, Lander, Wyo.

Application March 29, 1938, Serial No. 198,745

4 Claims. (Cl. 37—169)

My invention relates to land levelers and more particularly to a type adapted to be drawn by a tractor or a draft animal.

One of the principal objects of my invention is to provide a land leveler equipped with means whereby a single operator may readily adjust the same before and during the operation thereof.

Another object of my invention is to provide a device of the above described character capable of crosswise adjustment for operation in connection with wide as well as narrow areas of land.

A further object of my invention is to provide a land leveler of the above described character which is simple in construction, easy of operation, efficient in use and economical in manufacture.

Other objects and advantages will be apparent from the following description, appended claims and annexed drawing.

Referring to the drawing wherein like reference characters designate like parts throughout the several views:

Figure 1 is a top plan view of my invention.

Figure 2 is a side elevation thereof.

Figure 3 is a detail perspective view of the scraper blade.

Figure 4 is a detail bottom plan view of one of the axle bearings.

In practicing my invention I provide a land leveler having a frame comprising longitudinally extending side members 5 secured together at the forward ends thereof by means of a hinge 6 whereby the members may be adjusted relative to each other. The hinge has secured thereto a combined draft bar and skid member 7. The opposite or rear ends of the members 5 have secured to the lower faces thereof pivotable bearings 8 by means of bolts 9 secured within arcuate slots 10 formed in said bearings.

An axle 11 extends below the rear ends of said members 5 and is journaled for rotation within the bearings 8. Said axle is equipped with telescoping sections whereby to permit longitudinal adjustment thereof together with the side members 5. The outer ends of said axle sections are offset and form crankshafts 12 having wheels 13 rotatably mounted thereon whereby the leveler may be moved over the ground when the combined draw bar and skid member 7 is attached to a tractor or draft animal, as the case may be. When the device is operated through the medium of a draft animal, the member 7 serves to maintain the forward ends of the side members in spaced relation relative to the ground. The axle sections are secured together in adjusted position and for rotation with each other by means of a set screw 14. An upwardly extending arm 15 is secured to said axle intermediate of the ends thereof for connection with one end of a tension spring 16, the opposite end of said spring being secured to brace members 17 adjustably connected to the side members 5. The spring 16 normally urges the wheels 13 downwardly relative to the members 5.

The outer ends of the axle sections are provided with crank arms 18 connected to the rear ends of an operating rod 19, the forward end of said operating rod is connected to an operating lever 20 having a dog 21 for engagement with teeth formed on a segment 22 mounted on cross members 23 secured to the members 5 whereby operation of said lever 20 in one direction serves to raise the wheels relative to the frame and operation in an opposite direction serves to lower said wheels relative to the frame.

Secured to the underfaces of the members 5 are adjustable braces 24 coacting together to support under said frame a scraper blade 25. The blade 25 comprises a pair of endwise adjustable sections 26 and 27 forming the blade proper. Said sections are fashioned with sides 28 connected together at the forward ends thereof by adjustable cross bars 29. Both the bars 29 and sections 26 and 27 are provided with a plurality of openings for the reception of bolts and nuts whereby to effect the longitudinal adjustment of the blade and to secure the same to the braces 24.

The members 17 and 23 are likewise provided with a plurality of openings for receiving bolts whereby the same are adjusted relative to the members 5.

The ends of the blade extend beyond the side faces of the wheels 13 for engagement with the ground and endwise adjustment of the blade should likewise effect longitudinal adjustment of the axle to maintain the outer face of the wheels within the area covered by the blade.

From the foregoing it will be apparent that the blade 27 may be adjusted relative to the ground to effect a predetermined leveling thereof by operation of the lever 20 to rotate the axle 11 and consequent raising or lowering of the wheels 13 relative to the members 5. When the wheels 13 are lowered relative to the members 5, the spring 16 serves to assist in such operation. A leveler as herein set forth and described is adapted for use in connection with the leveling of roads and other ground areas and it is to be understood that various modifications may be made therein without departing from the spirit of the invention or scope thereof as claimed.

What I claim is:

1. In a land leveler, a frame having side members hinged together at one end for adjustment relative to each other, an axle having adjustable sections secured to the opposite ends of said members and movable therewith, each of said sections having ends offset to form crank shafts, wheels mounted on said crank shafts for supporting said frame in adjusted position above the ground, a blade mounted subjacently on said frame between the hinged ends and said wheels and adjustable with the frame, and manually operable means on said frame for rotating said axle whereby to raise and lower said wheels relative to said frame to effect adjustment of said blade relative to the ground.

2. In a land leveler, a frame having side members hinged together at one end for adjustment relative to each other, an axle having adjustable sections secured to the opposite ends of said members and movable therewith, each of said sections having ends offset to form crank shafts, wheels mounted on said crank shafts for supporting said frame in adjusted position above the ground, a blade mounted subjacently on said frame between the hinged ends and said wheels and adjustable with the frame, manually operable means on said frame for rotating said axle whereby to raise and lower said wheels relative to said frame to effect adjustment of said blade relative to the ground, and resilient means secured to said frame and to said axle for normally urging said wheels downwardly relative to said frame.

3. In a land leveler, a frame having side members hinged together at one end for adjustment relative to each other, an axle having adjustable sections secured to the opposite ends of said members and movable therewith, each of said sections having ends offset to form crank shafts, wheels mounted on said crank shafts for supporting said frame in adjusted position above the ground, a blade having endwise adjustable sections mounted subjacently on said frame between the hinged ends and said wheels and adjustable with the frame, and manually operable means on said frame for rotating said axle whereby to raise and lower said wheels relative to said frame to effect adjustment of said blade relative to the ground.

4. In a land leveler, a frame having side members hinged together at one end for adjustment relative to each other, an axle having adjustable sections secured to the opposite ends of said members and movable therewith, each of said sections having ends offset to form crank shafts, wheels mounted on said crank shafts for supporting said frame in adjusted position above the ground, a blade having endwise adjustable sections mounted subjacently on said frame between the hinged ends and said wheels and adjustable with the frame, manually operable means on said frame for rotating said axle whereby to raise and lower said wheels relative to said frame to effect adjustment of said blade relative to the ground, and resilient means secured to said frame and to said axle for normally urging said wheels downwardly relative to said frame.

JAMES A. GLENN.